ELECTRICAL CROSSBAR SWITCHING MATRIX HAVING GATE ELECTRODE CONTROLLED RECTIFIER CROSS POINTS
Filed Oct. 1, 1962
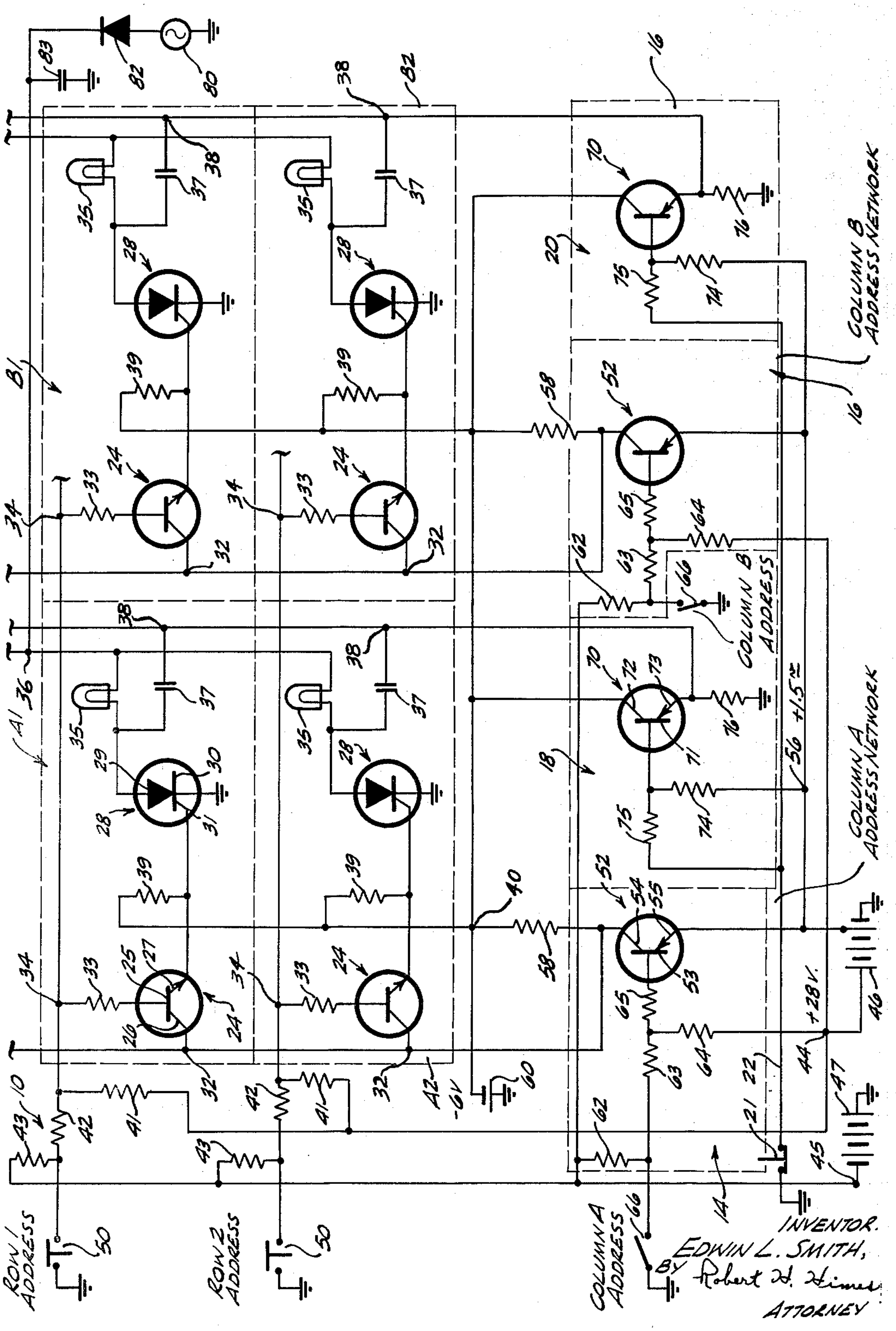
INVENTOR.
EDWIN L. SMITH,
BY Robert H. Himes
ATTORNEY United States Patent Office 3,251,036
Patented May 10, 1966

3,251,036

ELECTRICAL CROSSBAR SWITCHING MATRIX HAVING GATE ELECTRODE CONTROLLED RECTIFIER CROSS POINTS

Edwin L. Smith, Garden Grove, Calif., assignor to Hughes Aircraft Company, Culver City, Calif., a corporation of Delaware
Filed Oct. 1, 1962, Ser. No. 227,321
6 Claims. (Cl. 340—166)

This invention relates to a crossbar switching apparatus using only solid state components and, more particularly, to crossbar switching apparatus employing silicon-controlled-rectifiers as the respective switching elements.

Present day crossbar switching apparatuses employ electro-mechanical switching elements which are typically subject to deterioration by corrosion, dust and wear and respond poorly to shock and vibration. In addition, electromechanical switching elements require adjustment of the relay swing, spring tension and alignment of the contacts. In addition, electromechanical switching elements are susceptible to jamming due to a wrong sequence of commands. For example, through the use of "comparison" and "inhibit" lines in an electromechanical crossbar switch, it is possible to jam the crossbar switch by a wrong sequence of commands between two batteries, in which case the entire electro-mechanical switching apparatus along a particular coordinate must be cleared and the system allowed to recycle. An electrical crossbar switching apparatus in accordance with the present invention, on the other hand, does not require the use of inhibit and comparison lines and therefore eliminates the possibility of jamming thereby destroying a battery status indication along an entire X or Y coordinate for one battery status error along the remaining coordinate.

It is therefore an object of the present invention to provide an improved electrical crossbar switching apparatus.

Another object of the present invention is to provide an electrical crossbar switching apparatus that cannot be jammed by a wrong sequence of commands.

Still another object of the present invention is to provide an electrical crossbar switching apparatus employing silicon-controlled-rectifiers as the respective switching elements.

A further object of the present invention is to provide an electrical crossbar switching apparatus having identical switching networks at each X and Y coordinate thereof.

In accordance with the present invention, each crossbar network includes a light or equivalent load impedance which is returned to ground through a silicon-controlled-rectifier. Each of the lights is coupled to a common unidirectional alternating-current source. In addition, each crossbar network includes a transistor having a first electrode responsive to an X-coordinate signal and a second electrode responsive to a Y-coordinate signal. The respective remaining electrodes of the transistors are connected to the silicon-controlled-rectifiers in a manner to control the commencement of current flow therethrough.

In operation, X and Y coordinate control networks are provided to apply "information" or "zero" level signals to the appropriate electrode of each transistor. Coincidence of information level signals on two electrodes of a particular transistor is required to initiate current flow from the common direct-current source through the light and associated silicon-controlled-rectifier to ground. Once commenced, current continues to flow through the light and associated silicon-controlled-rectifier even after the removal of the information level signals until such time as the current flow through the silicon-controlled rectifier is reversed. Termination of current flow through a particular silicon-controlled-rectifier is accomplished, for example, by applying a pulse of current through all of the silicon-controlled-rectifiers identified with the particular coordinate.

The above-mentioned and other features and objects of this invention and the manner of obtaining them will become more apparent by reference to the following description taken in conjunction with the accompanying drawing, wherein the figure shows a schematic circuit diagram having by way of example two crossbar switching networks along an X and Y coordinate.

Referring now to the drawing, there is shown a crossbar switching apparatus in accordance with the present invention wherein two crossbar switching elements by way of example are shown in first and second columns and first and second rows. The first and second columns are designated column A and column B, respectively, the first and second rows designated row 1 and row 2, respectively. A crossbar switching element common to a particular column and row is designated by the letter designating the column and the number designating the row, thus switching elements A1, A2 are the switching elements in column A, rows 1 and 2, respectively, and crossbar switching elements B1 and B2 are in rows 1 and 2, respectively, of column B. Although only two crossbar switching elements are shown in each row and in each column, it is considered within the scope of the teachings of the present specification to have any desired number of crossbar switching elements in each row and in each column.

Rows 1 and 2 are provided with address networks 10, 12, respectively. In addition, columns A and B are provided with address networks 14, 16, respectively. Lastly, each of the columns A and B are provided with reset networks 18, 20, respectively. Reset of the crossbar switching elements A1, A2, B1, B2, by means of the reset networks 18, 20, is, for example, initiated by means of a normally closed switch 21 which opens a lead 22 which is connected therethrough to ground.

The crossbar switching elements A1, A2 . . ., and crossbar switching elements B1, B2 . . ., are all the same, hence respective corresponding components thereof will be designated by the same reference numerals. In particular, each crossbar switching element A1, A2, B1, or B2 includes a n-p-n type transistor 24 having a base 25, a collector 26 and an emitter 27. The transistor 24 may, for example, be of a type designated commercially as "2N1302." In addition, each crossbar switching element includes a silicon-controlled-rectifier 28 having an anode 29, a cathode 30 and a gate electrode 31. The silicon-controlled-rectifier 28 may be of a type designated as "HCR 30P." Collector 26 of transistor 24 is connected to a column-input terminal 32; base 25 is connected through a resistor 33 to a row-input terminal 34; and emitter 27 is connected directly to the gate electrode 31 of silicon-controlled-rectifier 28. The resistor 33 may, for example, be of the order of 5100 ohms. The cathode 30 of silicon-controlled-rectifier is referenced to ground and the anode 29 thereof is connected through a lamp 35 to a lamp-power-input terminal 36. Further, the junction between anode 29 of silicon-controlled-rectifier 28 and lamp 35 is connected through a capacitor 37 to a reset-input terminal 38. Lastly, the respective junctions between emitter 27 of transistor 24 and gate electrode 31 of silicon-controlled-rectifier 28 are connected through a resistor 39 to a bias-input terminal 40. The resistor 39 may, for example, be of the order of 5100 ohms.

Each of the address networks 10, 12 includes a resistor dividing network constituting resistors 41, 42 and 43 connected in the order named from a junction 44 maintained at a positive potential level to a junction 45 maintained at a negative potential level. Resistors 41, 42, 43 may, for example, have ohmic values of 10,000, 3000 and 2000 ohms, respectively. Also, the junction 44 is maintained at a positive potential level of the order of +28 volts relative to ground by means of a connection to the positive terminal of a battery 46, the negative terminal of which is referenced to ground. The junction 45, on the other hand, is maintained at a negative potential level of the order of −26.5 volts relative to ground by means of a connection therefrom to the negative terminal of a battery 47, the positive terminal of which is referenced to ground. The junction between resistors 42, 43 is connected through normally open switches 50 to ground. The closing of a particular switch 50 constitutes "addressing" the row corresponding to the switch 50 thus closed. In the actual use of the present invention, it is considered within the scope of the teachings of the present invention to replace the switch 50 of the respective rows of address networks 10, 12 with appropriate gating networks.

Further, each of the columns A and B of address networks 14, 16 include a p-n-p type transistor 52 having a base 53, a collector 54 and an emitter 55. The transistor 52 may, for example, be of a type designated commercially as "2N404." The emitter 55 of transistor 52 is connected to a junction 56 which is maintained at a potential level of the order of +1.5 volts relative to ground by means of a connection therefrom to an intermediate terminal of the battery 46. The collector 54 of transistor 52, on the other hand, is connected to all of the column-input terminals 32 of the corresponding column. That is, the collector 54 of transistor 52 of the column A address network 14 is connected to the column-input terminals 32 of the crossbar switching elements A1, A2, and the emitter 54 of transistor 52 of the column B address network 16 is connected to the column-input terminals 32 of crossbar switching elements B1, B2. In addition, the collectors 54 of transistors 52 are each connected through a resistor 58 to the bias junction 40, which junction 40 is, in turn, maintained at a potential level of the order of −6 volts relative to ground by means of a connection to the negative terminal of battery 60, the positive terminal of which is referenced to ground. In addition, each of the column address networks 14, 16 include a resistor dividing network constituting resistors 62, 63 and 64 connected in the order named from the negative junction 45 to the positive junction 44. The resistors 62, 63, 64 may, for example, have ohmic values of 2000, 3000 and 15,000 ohms, respectively. The junction between resistors 63, 64 is connected through a resistor 65 to the base 53 of the transistors 52 and the junction between resistors 62, 63 is connected through normally open switches 66 to ground. The resistors 65 each have an ohmic value of the order of 5100 ohms.

Lastly, the reset-networks 18, 20 corresponding to columns A, B, respectively, each include a p-n-p type transistor 70 having a base 71, a collector 72 and an emitter 73. The collectors 72 of transistors 71 are maintained at a potential of −6 volts relative to ground by means of a connection therefrom directly to the junction 40. In addition, the base 71 of transistor 70 is connected through a resistor 74 to the junction 56 which, as previously specified, is maintained at a potential level of 1.5 volts relative to ground. Resistors 74 may, for example, have an ohmic value of 2000 ohms. Also, the bases 71 of transistors 70 are each connected through a resistor 75 to the lead 22 which is returned to ground to the normally closed switch 21. The resistor 75 may, for example, have an ohmic value of 5100 ohms. Further, the emitters 73 of transistors 70 are each returned to ground through a resistor 76 and, in addition, the emitter 73 from the reset-network 18 is connected to the reset-input terminals 38 of the crossbar switching elements A1, A2, and the emitter 73 from the reset-network 20 is connected to the reset-input terminals 38 of crossbar switching elements B1, B2. Thus, if desirable, it is evident that the crossbar switching elements in any column A or B may be reset individually.

Lastly, an alternating power source 80 is referenced to ground and is connected through a diode 82 to all of the lamp-input terminals 36 of the crossbar switching elements A1, A2, B1, B2. The diode 82 is poled to allow normal current flow through the silicon-controlled rectifiers 28 when appropriately gated. The output waveform from the diode 82 is smoothed by means of a capacitor 83 connected from the lamp-power-input terminals 36 to ground. Minimum requirements are that the current flow be adequate to maintain current flow through the silicon-controlled-rectifiers 28 once current flow therethrough has commenced.

In the operation of the crossbar switching apparatus of the present invention, the row-address switches 50 operate in conjunction with the resistor dividing networks 10 to apply a potential of the order of −8 volts relative to ground to the row-input terminals 34 when in the non-address state, and a potential of the order of +6.5 volts relative to ground when in the address state. When in the non-address state, the row-address switches 50 are in the open circuit position and when in the address state, a connection is made through a row-address switch 50 to ground. Thus, in the non-address position the resistors 41, 42 and 43 divide the entire voltage between junctions 44 and 45 to produce the potential of the order of −8 volts at the row-input terminals 34, and in the address position the resistors 41 and 42 divide the voltage appearing at junction 44 only to produce the voltage of +6.5 volts at the row-input terminals 34.

Referring now to the column-address networks 14, 16, the resistors 62, 63, 64 generate a voltage of −13 volts relative to ground at the base 53 of transistor 52 in the non-address state and a voltage of +5 volts relative to ground at the base 53 in the address state. A particular column, such as column A or B, is address by closing the corresponding switch 66 thereby connecting the junction between resistors 62 and 63 to ground. In that the transistor 52 is of the p-n-p type and the emitter 55 thereof is maintained at +1.5 volts relative to ground, the +5 volts applied to the base 53 is generated at the collector 54 thereof and, accordingly, is applied to the corresponding column-input terminals 32.

During the non-excited state, the battery 60 applies a voltage of the order of −6 volts relative to ground to the gate electrode 31 of each of the silicon-controlled-rectifiers 28. This voltage remains substantially at this level until such time as both the row and column of a particular cross-bar switching element A1, A2, B1 or B2 is addressed. In this event, the collector 26 is raised to +6.5 volts and the base 25 to +5 volts thereby causing current to flow from the emitter 27 thereof thereby increasing the gate electrode 31 of the silicon-controlled-rectifier 28 to a potential of nearly +5 volts. This increase in potential of the gate electrode 31 of silicon-controlled-rectifier 28 allows current to flow from the alternating-current source 80 through diode 82, lamp 35 and silicon-controlled-rectifier 28 to ground. As previously specified, the capacitor 83 smooths out and clamps the rectified waveform of alternating-current source 80 sufficient to maintain the silicon-controlled-rectifier 28 in a conducting state; i.e., current continues to flow therethrough until terminated by other means. In accordance with the present invention, current continues to flow through the lamp 35 in a particular crossbar switching element A1, for example, until a different crossbar switching element 82 in the same column A is turned on. In the non-turned on state, the anode 29 of silicon-controlled-rectifier 28 is generally at the peak voltage of the rectified waveform provided by alternating-current source 80 and diode 82. Upon the turning on of an additional lamp 35 in the same column A, the potential across the silicon-controlled-rectifier 28 decreases rapidly to substantially zero. This decrease in potential is transmitted through capacitor 37 to the reset-input 38 and is applied to all the remaining reset-inputs 38 in the same column A. This negative pulse is applied thorugh the remaining capacitors 37 to the silicon-controlled-rectifier 28 to decrease the voltage drop thereacross to zero thereby terminating the flow of current through the silicon-controlled-rectifier 28 of column A in conduction.

In the event that it is desired to clear all of the crossbar switching elements in a particular row, the reset devices 18, 20 may be employed to generate a negative pulse in response to the disconnecting of the lead 22 from ground by means of the normally closed switch 21. In particular, when switch 21 is open-circuited, the potential of base 71 of transistor 70 is increased in potential towards +1.5 volts relative to ground thereby allowing current to flow through resistor 76 and transistor 70 to the negative source 60. This commencement of current flow through resistor 76 produces a negative voltage excursion which is applied to the reset-input terminals 38 through capacitor 37 to the silicon-controlled-rectifiers 28 thus decreasing the voltage thereacross to the point where current ceases to flow therethrough. Although lead 22 is shown connected to all of the reset apparatuses 18, 20, it is within the scope of the teachings of the present case to employ switch 21 for each individual column A or B whereby each column A or B can be reset individually.

Although the invention has been shown in connection with a certain specific embodiment, it will be readily apparent to those skilled in the art that various changes in form and arrangement of parts may be made to suit requirements without departing from the spirit and scope of the invention.

What is claimed is:

1. An electronic crossbar switching apparatus having no less than two columns and no less than two rows, said apparatus comprising:

(a) first and second sets of electrical conductors corresponding to said no less than two columns and said no less than two rows, respectively;

(b) means connected to said first set of electrical conductors for applying to each conductor thereof a voltage of either a first or a second potential level;

(c) means connected to said second set of electrical conductors for applying to each conductor thereof a voltage of either a third or a fourth potential level;

(d) a plurality of output load impedances each connected in series with a silicon-controlled-rectifier corresponding to a pair of conductors constituting one conductor from each of said first and second sets thereof, each of said silicon-controlled-rectifiers having a gate electrode;

(e) means for applying a unidirectional voltage across each output load impedance and serially connected silicon-controlled-rectifier; and (f) means connected to said gate electrodes and responsive to a predetermined combination of said first or second potential levels on the corresponding one conductor of said first set of electrical conductors and said third or fourth potential levels on the corresponding one conductor of said second set of electrical conductors for allowing current flow through respective silicon-controlled-rectifiers and concomitant output load impedances to commence.

2. The electronic crossbar switching apparatus as defined in claim 1 additionally including a common junction and no less than two capacitors coupled from said common junction to a predetermined group of said silicon-controlled-rectifiers at the respective terminals thereof connected to the concomitant output load impedances whereby commencement of current flow through any one of said silicon-controlled-rectifiers of said predetermined group causes cessation of current flow through the remainder of said silicon-controlled-rectifiers of said predetermined group.

3. The electronic switching apparatus as defined in claim 2 additionally including means coupled to said common junction for momentarily reversing any current flow through a silicon-controlled-rectifier of said predetermined group thereby to cause current flow therethrough to cease.

4. An electronic crossbar switching apparatus having a plurality of columns and a plurality of rows, said apparatus comprising:

(a) an electrical conductor corresponding to each column of said plurality of columns and an electrical conductor corresponding to each row of said plurality of rows;

(b) means connected to each of said conductors corresponding to each column of said plurality of columns for applying a voltage to each conductor that is either positive or negative relative to a predetermined reference potential levels;

(c) means connected to each of said conductors corresponding to each row of said plurality of rows for applying a voltage to each conductor that is either positive or negative relative to said predetermined reference potential level;

(d) means for providing a first source of potential that is positive relative to said predetermined reference potential level;

(e) a lamp and a silicon-controlled-rectifier for no less than two combinations of one of said conductors corresponding to one of said plurality of columns and one of said conductors corresponding to one of said plurality of rows connected in series from said first source to a common junction maintained at said predetermined reference potential level, said silicon-controlled-rectifier having an anode connected to said lamp, a cathode connected to said common junction and a gate electrode;

(f) a n-p-n type transistor corresponding to each of said silicon-controlled rectifiers, said transistor having a base connected through a resistor to said one of said conductors corresponding to one row of said plurality of rows, a collector connected to said one of said conductors corresponding to one column of said plurality of columns, and an emitter connected to said gate electrode of said corresponding silicon-controlled-rectifier;

(g) means for providing a second source of negative potential relative to said predetermined reference potential level; and (h) a connection from said gate electrode of each silicon-controlled-rectifier through a load resistor to said second source of negative potential whereby application of a positive voltage to said conductors of one combination of said no less than two combinations allows current to commence flowing through said lamp and said silicon-controlled-rectifier corresponding thereto.

5. The electronic crossbar switching apparatus as defined in claim 4 additionally including a capacitor connected from said anode of each of a predetermined group of said silicon-controlled-rectifiers whereby commencement of current flow through any one of said silicon-controlled-rectifiers of said predetermined group causes cessation of current flow through the remainder of said silicon-controlled-rectifiers of said predetermined group.

6. The electronic crossbar switching apparatus as defined in claim 5 wherein said predetermined group of silicon-controlled-rectifiers constitutes the silicon-controlled-rectifiers corresponding to all of the combinations of one of said columns and including means coupled to said common junction for momentarily reducing any current flow through a silicon-controlled-rectifier of said predetermined group to zero thereby to cause current flow therethrough to cease.

References Cited by the Examiner

UNITED STATES PATENTS

| | | | |
|---|---|---|---|
| 2,769,865 | 11/1956 | Faulkner. | |
| 2,825,889 | 3/1958 | Henle | 340—166 |
| 2,889,537 | 6/1959 | Elliott | 340—166 |
| 2,892,437 | 6/1959 | Feiner | 340—166 X |
| 3,105,224 | 9/1963 | Williams | 340—166 |
| 3,107,341 | 10/1963 | Ulmer | 340—166 |

NEIL C. READ, *Primary Examiner.*

H. I. PITTS, *Assistant Examiner.*